United States Patent Office 3,347,027
Patented Oct. 17, 1967

3,347,027
WATER SEPARATOR CONSTRUCTION
Mark E. Baker, Winsted, and Joseph P. Burger, Torrington, Conn., assignors to United Aircraft Corporation, East Hartford, Conn., a corporation of Delaware
Filed Aug. 28, 1964, Ser. No. 392,747
1 Claim. (Cl. 55—320)

ABSTRACT OF THE DISCLOSURE

An apparatus for separating liquid particles from air wherein the air with entrained particles is passed through a coalescer to agglomerate said particles and subsequently pass through a vortex-type separator, said apparatus including means to by-pass said coalescer if it becomes clogged.

---

This invention relates to water separators and constitutes an improvement over the water separator described and claimed in U.S. Patent No. 2,835,340 granted to McGuff et al. on May 20, 1958.

An object of this invention is to provide an improved water separator of the type that includes a vortex generator wherein the swirl vanes extend on the outer diameter of a cylindrical tube.

A still further object of this invention is to provide a cylindrical perforated collector for a water separator having an exit tube extension having a diameter substantially equal to 5/6 of the collector diameter.

A still further object of this invention is to provide a combined improved vortex and collector for a water separator which is characterized by being relatively simple to manufacture, economical to make and one that improves the overall efficiency of the water separator.

In an air conditioning system utilized for controlling the environment within an aircraft and particularly of the air cycle type, bleed air taken from the power plant in normal practice is passed through a refrigeration unit such as a turbo compressor type and then direct to the compartment or the cabin intended to be cooled for maintaining proper environmental conditions. In these types of systems, particularly where the air evidences an adiabatic expansion in driving the turbine, the partial pressure of the moisture which is contained in the air stream decreases such that the moisture is separated from or carried with the air stream in the form of fog or mist and consisting of many fine particles of moisture. Unless the moisture is removed from the air stream, these particles discharge into the cabin creating a foggy or misty atmosphere, or on occasions these particles could freeze into ice which would be carried into the cabin. To eliminate this undesirable condition, it is a well-known expedient to provide a suitable water or moisture separator. Since the water separator is the primary concern of this invention, for convenience the details of a suitable air conditioning system have been eliminated. However, for further details of a suitable system, reference should be made to U.S. Patent No. 2,835,340 supra.

Other features and advantages will be apparent from the specification and claim and from the accompanying drawings which illustrate an embodiment of the invention.

Figure 1:
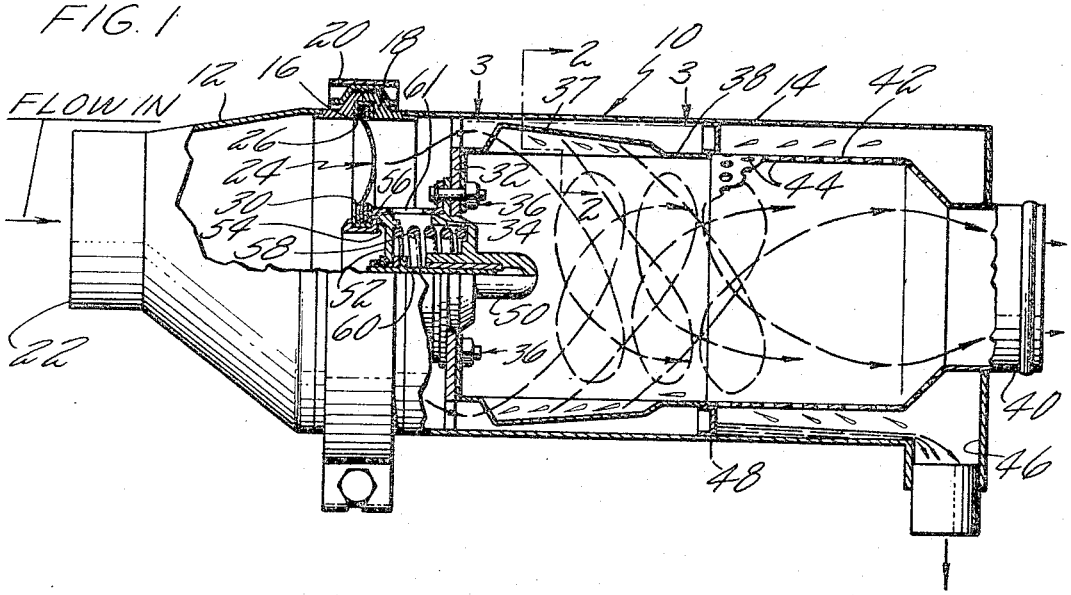
FIG. 1 is a side elevation partly in section of the assembled water separator.
Figure 2:
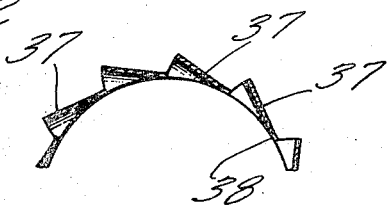
FIG. 2 is a partial section taken along lines 2—2 of FIG. 1.
Figure 3:
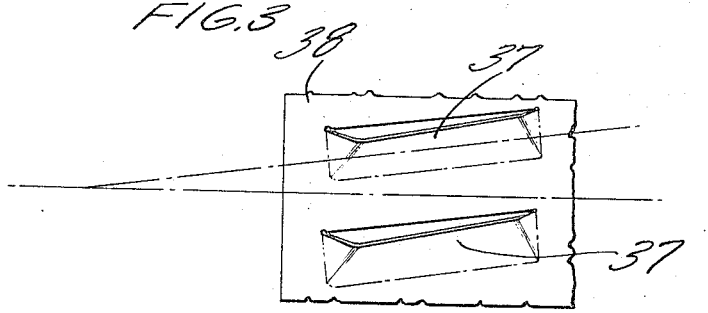
FIG. 3 is a partial view externally of the inner member of the water separator taken along lines 3—3 of FIG. 1.

Referring now particularly to FIGS. 1, 2 and 3, the water separator generally illustrated by numeral 10 comprises a forward mounted casing member 12 and a rearward mounted casing member 14, each carrying at their ends suitable flanges 16 and 18 adapted to engage each other for defining a housing for the assembled water separator. Suitable clamp means 20 engaging the flanges 16 and 18 rigidly secure and hold the casing members 12 and 14 in place. An inlet 22 is provided in the casing member 12 and is adapted to receive suitable ducting (not shown) for admitting air into the water separator which air contains entrained moisture particles as was explained above. Air admitted into the water separator is then directed through the coalescer generally indicated by numeral 24. Coalescer which may be made from a suitable woven, knitted or matted fabric is preformed in the shape of a ring or washer and is supported at its outer periphery by a ring clamp generally illustrated by numeral 26. The inner periphery of the coalescer disc is secured to the ring clamp member generally indicated by numeral 30. The ring clamp 30 is secured to bulkhead 32 which has one end suitably connected to the inside wall of casing 14 by annular support member 34. Member 34 is, in turn, secured to bulkhead by suitable unit and bolt assemblies indicated generally by numeral 36.

Apertures formed in the bulkhead direct the air discharging from the coalescer to swirl vanes 37 which are formed in the vortex generator mechanism generally indicated by numeral 38. These vanes may be stamped out of the cylindrically-shaped vortex generator casing 38 and are adapted to impart a swirling movement of the air impinging thereagainst. The material stamped from the casing to form the vanes form openings in the body of 38 for admitting air internally thereof. The direction of air is changed wherein a swirling motion is imparted thereto as illustrated in FIG. 1, and then discharged out of centrally disposed outlet duct 40. As noted from the drawing the plurality of vanes disposed about the circumference extend outwardly from the cylindrical body 38, taper inwardly toward the longitudinal axis and are misaligned circumferentially as illustrated in FIG. 3. By virtue of this arrangement the vanes tend to collect the droplets impinging thereon, which droplets adhere to the inner wall of 38 and migrate to the collector section of the water separator.

The collector section of the water separator comprises a generally cylindrically-shaped tube 42 having a plurality of small apertures 44 which serve to permit the droplets being centrifuged by virtue of the swirling air to migrate toward the inner wall of casing 14. Here the droplets by virtue of gravity fall to the bottom where they are, in turn, collected and dumped out of the separator through opening 46. The collector section at a point toward the outlet receiving section 42 is faired inwardly toward the axis of rotation and joins the outlet duct 40 which is formed concentric with the collector tube. It has been found that by adding this faired portion to the collector section and reducing the diameter of the outlet duct so that the ratio of diameter is approximately 6 to 5, the overall efficiency of the water separator is greatly increased.

In the event that the coalescer 24 becomes clogged a bypass valve generally indicated by numeral 50 is provided. Bypass valve may comprise annular support member 34 which is secured to bulkhead 32 as was noted above. A spring bias valve disc 52 is urged against a seat 54 formed on an inwardly projecting flange 56 of support member 34. Spring 58 acts against the rear seat of valve disc 52 urging it in the closed position. The inner diameter of valve disc 52 is slidably mounted on fixed shaft 60 and moves rightwardly when the pressure acting on the face of valve disc 52 exceeds the force created by spring 58. When the valve opens, flow admitted internally of the water separator is directed to bypass coalescer 24, passes through slots 61 (only one being shown) formed in member 34 and then to the turning vanes 37 by way of the aperture formed in bulkhead 32.

It should be understood that the invention is not limited to the particular embodiments shown and described herein, but that various changes and modifications may be made without departing from the spirit or scope of this novel concept as defined by the following claim.

We claim:

In apparatus for removing particles of liquid entrained in a stream of gaseous fluid, the combination of: a housing adapted to be disposed in a fluid line, an inlet at one end of the housing for receiving liquid entrained gaseous fluid, a coalescer in said housing adapted to agglomerate said entrained liquid for enlarging the size of the liquid droplets, a vortex generator in said housing downstream of said coalescer having a cylindrically-shaped wall defining a vortex chamber and being coaxially mounted relative to the longitudinal axis of said housing, said cylindrically-shaped wall containing a plurality of openings and adjacent upstanding swirl vanes extending toward but spaced from the inner wall of said housing, each swirl vane having a longitudinal axis angularly disposed relative to the longitudinal axis of said housing, collector means in said housing disposed downstream from said vortex generator having one end connected to said wall and communicating with said vortex chamber, said collector having moisture drainage means for collecting moisture from said apparatus dry fluid outlet means communicating internally with said collector means, said collector means formed from a perforated hollow member having a cylindrical section whose diameter is substantially the same as said cylindrically-shaped wall and being spaced from the inner wall of said housing, a reduced cylindrical section, a conical section interconnecting the cylindrical section with a larger diameter, and the reduced cylindrical section, and the diameter of the reduced cylindrical section being in the order of ⅝ of the diameter of said larger cylindrical section.

References Cited

UNITED STATES PATENTS

| | | | |
|---|---|---|---|
| 1,923,515 | 8/1933 | Stull | 55—455 X |
| 2,233,079 | 2/1941 | Hawley | 55—455 |
| 2,425,488 | 8/1947 | Alexander | 55—452 |
| 2,709,501 | 5/1955 | Toth et al. | 55—455 X |
| 2,792,075 | 5/1957 | McBride et al. | 55—321 |
| 2,823,760 | 2/1958 | Andersen. | |
| 2,921,646 | 1/1960 | Poole. | |
| 3,251,176 | 5/1966 | Gleason | 55—452 |

FOREIGN PATENTS

| | | |
|---|---|---|
| 800,932 | 9/1958 | Great Britain. |
| 960,504 | 6/1964 | Great Britain. |

HARRY B. THORNTON, *Primary Examiner.*

S. W. SOKOLOFF, *Assistant Examiner.*